US012269054B1

(12) United States Patent
Ferrie

(10) Patent No.: US 12,269,054 B1
(45) Date of Patent: Apr. 8, 2025

(54) PAINT SPRAYER MACHINE

(71) Applicant: South Texas Spray Equipment Rental & Repair, LLC, League City, TX (US)

(72) Inventor: George Ferrie, League City, TX (US)

(73) Assignee: South Texas Spray Equipment Rental & Repair, LLC, League City, TX (US)

( * ) Notice: Subject to any disclaimer, the term of this patent is extended or adjusted under 35 U.S.C. 154(b) by 0 days.

(21) Appl. No.: 18/405,748

(22) Filed: Jan. 5, 2024

Related U.S. Application Data

(60) Provisional application No. 63/589,007, filed on Oct. 9, 2023.

(51) Int. Cl.

| | |
|---|---|
| ***B05B 7/04*** | (2006.01) |
| ***B05B 7/00*** | (2006.01) |
| ***B05B 7/16*** | (2006.01) |
| ***B05B 7/24*** | (2006.01) |
| ***B05B 12/14*** | (2006.01) |

(52) U.S. Cl.
CPC .......... *B05B 7/0408* (2013.01); *B05B 7/0093* (2013.01); *B05B 7/166* (2013.01); *B05B 7/2472* (2013.01); *B05B 12/1436* (2013.01)

(58) Field of Classification Search
CPC ..... B05B 7/0408; B05B 7/0093; B05B 7/166; B05B 7/2472; B05B 12/1436
USPC ....... 239/124, 127, 128, 135, 139, 146, 407, 239/432, 525, 526; 366/144–148, 241, 366/243, 279
See application file for complete search history.

(56) References Cited

U.S. PATENT DOCUMENTS

| | | | | |
|---|---|---|---|---|
| 2,980,339 A * | 4/1961 | Bok | B05B 7/1673 | 239/125 |
| 3,008,808 A * | 11/1961 | Hodges | B05B 7/32 | 239/134 |
| 3,146,950 A * | 9/1964 | Lancaster | B05B 15/55 | 239/128 |
| 5,785,760 A * | 7/1998 | Sconyers | B05B 7/1673 | 239/139 |
| 6,234,666 B1 * | 5/2001 | Kolb | B01F 27/1142 | 366/343 |
| 11,647,689 B2 * | 5/2023 | Tabata | B01F 33/813 | 239/310 |
| 2001/0030241 A1 * | 10/2001 | Kott | B05B 7/166 | 239/303 |

(Continued)

*Primary Examiner* — Steven J Ganey
(74) *Attorney, Agent, or Firm* — K&L Gates LLP

(57) ABSTRACT

A paint spraying machine for applying plural component coating materials with a component A and a component B, the machine having separate hoppers for each component in which the components A and B are held respectively, a pump operable to separately pressurize the components to independently selected pressures for each component, where the pump includes a separate pump lower for each component, a mix manifold configured to receive the components separately from the pump and mix the components to a selected, fixed mix ratio, manually operated controls adjustable to control flow of the components through the machine, and a spray line including a spray gun operable to spray the mixed and pressurized components. The fixed mix ratio is determined by the volumetric displacement of the pump lowers selected. The components remain separate until combined together in the mix manifold forming the coating.

10 Claims, 4 Drawing Sheets

(56) References Cited

U.S. PATENT DOCUMENTS

2015/0158039 A1 * 6/2015 Collins .................. B05B 9/007
239/146

* cited by examiner

PAINT SPRAYER MACHINE

BACKGROUND

Faster-setting plural component coatings are particularly difficult to spray with a machine sprayer. For example, fireproofing coating material is composed of two components that are mixed together before spraying. However, once mixed, the components react with each other and harden after a certain amount of time, eventually becoming unsprayable. In order to effectively apply such plural component coatings, the temperature, pressure, flowrate, and ratio of the components being mixed are controlled as they are sprayed. If these variables are not carefully controlled, the components can go to waste, the resulting plural component coating can be inefficient, and the spraying equipment can be damaged.

The field of equipment for plural component sprayers is divided. Lower-end equipment, while less expensive, is labor intensive, requiring extensive cleaning and time compresses operating conditions. The lower-end equipment on the market uses a hot pot pump where components are added together in one container, manually mixed, and then sprayed by the machine. If the material is not sprayed in time the material hardens and the whole system needs to be flushed and restarted. Professional equipment alleviates these issues but is bulky and expensive and requires trained personnel to operate. The professional equipment on the market keeps the components in separate containers until mixed, which alleviates the time constraint and manual mixing of the lower-end equipment. However, the professional equipment uses electronic controls to operate the machine, which require trained personnel to operate and make the equipment expensive. Additionally, the professional equipment is large, making the equipment difficult to move.

Therefore a need exists for a novel paint sprayer machine that is less expensive and easier to operate than professional plural component sprayers, while also being easier to use and requiring less maintenance than lower-end sprayers.

BRIEF DESCRIPTION OF THE DRAWINGS

Aspects of the disclosure are described with reference to the following figures, the features of which are not necessarily shown to scale. Some details of elements may not be shown in the interest of clarity and conciseness.

DETAILED DESCRIPTION

The present disclosure describes a plural component paint spraying machine for spraying plural component coatings. Generally, the paint spraying machine is a plural component pump sprayer that allows components A and B to remain separate until they are brought to selected temperatures and pressures independently using manually operated controls. Once each component is brought up to the selected temperature and pressure for that component, the components are mixed using a fixed ratio mixer before entering a pump line to be sprayed as a combined material.

To set up the paint spraying machine, the machine is connected to a power and air source. The machine can be connected to a 120V (or other standardized voltage) electrical outlet for power and a suitable air compressor for air. The components to be mixed and sprayed are loaded into separate hoppers. Each component is heated using a respective heating system and recirculated using a pump until a selected temperature and pressure of each component is reached. The components are then pumped through the outlet manifold to the mix manifold, where the components are mixed to a specific mix ratio designated by the pump lowers of the pump. From the mix manifold, the mixture is then sprayed through the spray line including a spray gun.

The paint spraying machine keeps the components of the coating separate as they are brought up to a selected temperature, which is based on the components and the coating being sprayed. This enables the operator more time to bring the materials to temperature compared to a single container system where the components are loaded and manually mixed together. This also allows for less maintenance than a single container system since the components can be stored for extended periods of time without the risk of the components setting, requiring extensive maintenance. The paint spraying machine keeping the components separate until mixed reduces waste and material costs of the components compared to the single container system where the operator has a limited amount of time to spray the mixture before setting. Additionally, by keeping the components separate until mixed, only the portions of the paint spraying machine where the mixture passes through has to be flushed. This cuts down on clean up time compared to the single container system. The sprayer machine also uses manual controls, visual pressure gauges, and 120V power voltage to control the operation of the sprayer, allowing the sprayer to be easier to use than previous professional sprayers. The paint spraying machine can be fixed on a wheeled cart, making it portable and allowing the machine to be easily moved closer to the location of spraying compared to the professional sprayers that are bulky and are often fixed to a stationary rig.

Figure 1:
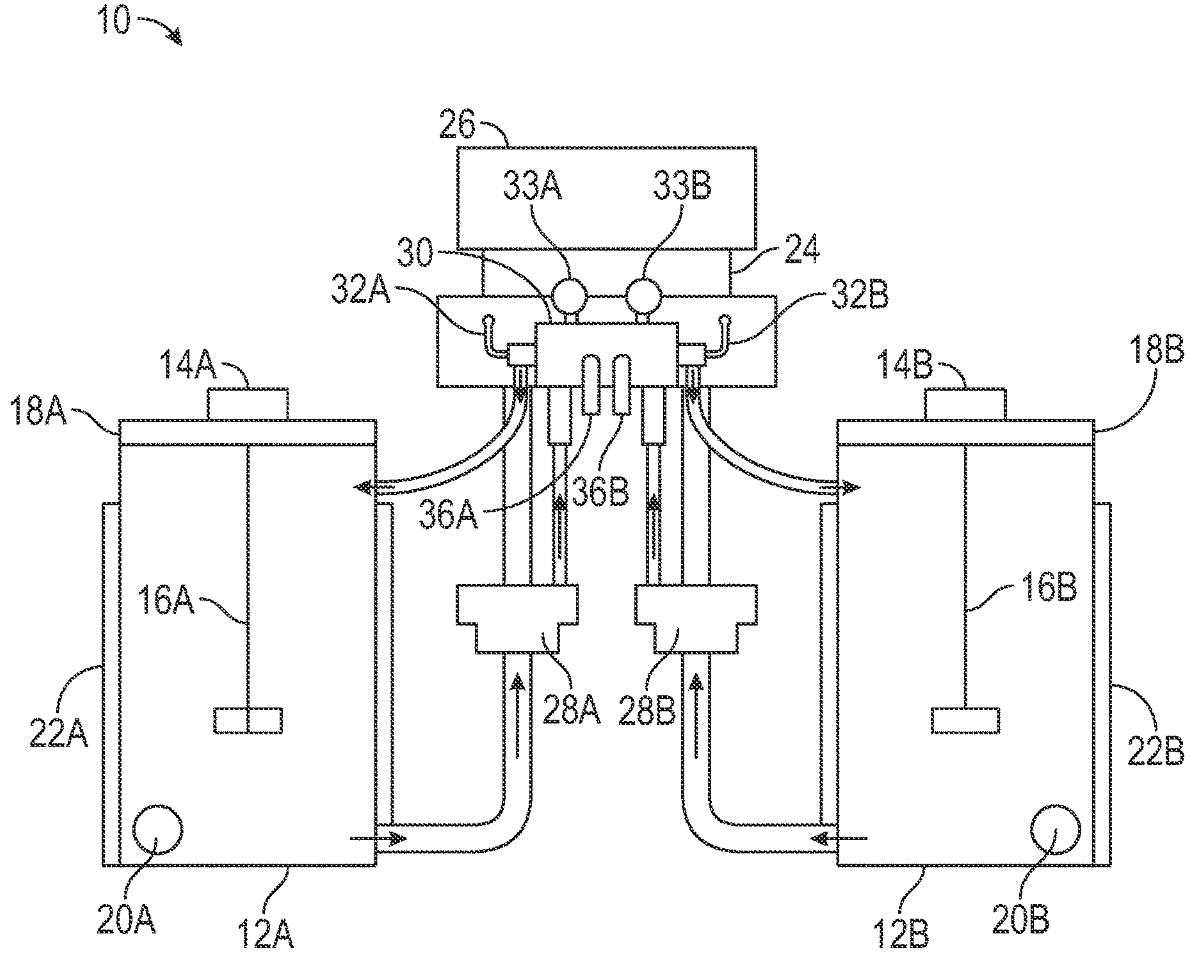
FIG. 1 is a diagram depicting a paint spraying machine in accordance with one or more embodiments.

FIG. 1 is a diagram depicting a paint spraying machine 10 in accordance with one or more embodiments that includes hoppers 12A, 12B, a pump 24, and an outlet manifold 30. Components A and B of the coating are added and stored separately in the designated hoppers 12A, 12B.

Each hopper 12A, 12B includes a powered mixer to mix the component within the hopper which helps maintain proper material consistency and consistent heating of the material within the hopper. The powered mixers are fixed to the lids of the hoppers 18A, 18B, and include motors 14A, 14B that drive propellers 16A, 16B to rotate which mixes the component within the hopper.

Each hopper 12A, 12B further includes a heating system to heat each component to a selected temperature within the hopper independently. The heating systems include heaters 20A, 20B and a heated jackets 22A, 22B around at least a portion of each hopper. The heated jackets 22A, 22B contain a heater fluid that is heated by the heaters 20A, 20B, which heats the component within the hopper. The selected temperature for each heating system can be set independently by any suitable means to control the temperature within each hopper. For example, heaters 20A, 20B can include control knobs which can be manually operated to select the selected temperature for each component, where the selected temperatures for each component are independently set for each component. Each heating system can heat the component within a respective hopper to an independent selected temperature such that the components may be heated to different selected temperatures or the same selected temperature. The selected temperature for a given component will depend on the component being heated and the selected temperature for that component for mixing with the other component or components for the coating.

The pump 24 includes an air motor 26 and pump lowers 28A, 28B. The air motor 26 drives the pump lowers 28A, 28B such that the components are drawn out of the hoppers 12A, 12B and either recirculated or passed through to the outlet manifold 30. The pump lowers 28A, 28B are supported underneath the air motor 26 such that the air motor 26 can actuate pump lowers 28A, 28B. The pump 24 is operable to separately pressurize each component independently. As discussed below, during recirculation component A and B pass through pump lowers 28A and 28B, respectively, which pressurize the respective component to a selected pressure.

The paint spraying machine 10 is configured for recirculation of each component. Each component is heated and recirculated within a respective hopper 12A, 12B until the selected temperature and pressure for that component is reached. As with temperature, each component may be pressurized to different selected pressures independently based on the selected pressure for that component for mixing with the other component or components for the coating. As shown, the component is drawn out of the respective hopper 12A or 12B by pump 24 and pump lower 28A or 28B through a line that is connected to the respective hopper. The component is pressurized by the pump lower 28A or 28B and is pumped to the outlet manifold 30 through another line. Then the component passes through the outlet manifold 30, and is recirculated back through a recirculation line to the hopper 12A or 12B. As the component passes through the outlet manifold 30, pressure gauges 33A and 33B on the outlet manifold 30 measure and display the pressure of component A and B, respectively, generated by the pump lowers 28A or 28B. The recirculation is repeated until the component reaches the selected temperature and pressure for mixing and spraying. Discussed below, the circulation valves 32A, 32B are manually operated to control the flow of the components for either recirculation, where the components exit the outlet manifold 30 through recirculation lines back to the hopper, or for mixing and spraying, where the components exit the outlet manifold 30 through component lines 36A, 36B.

Figure 2:
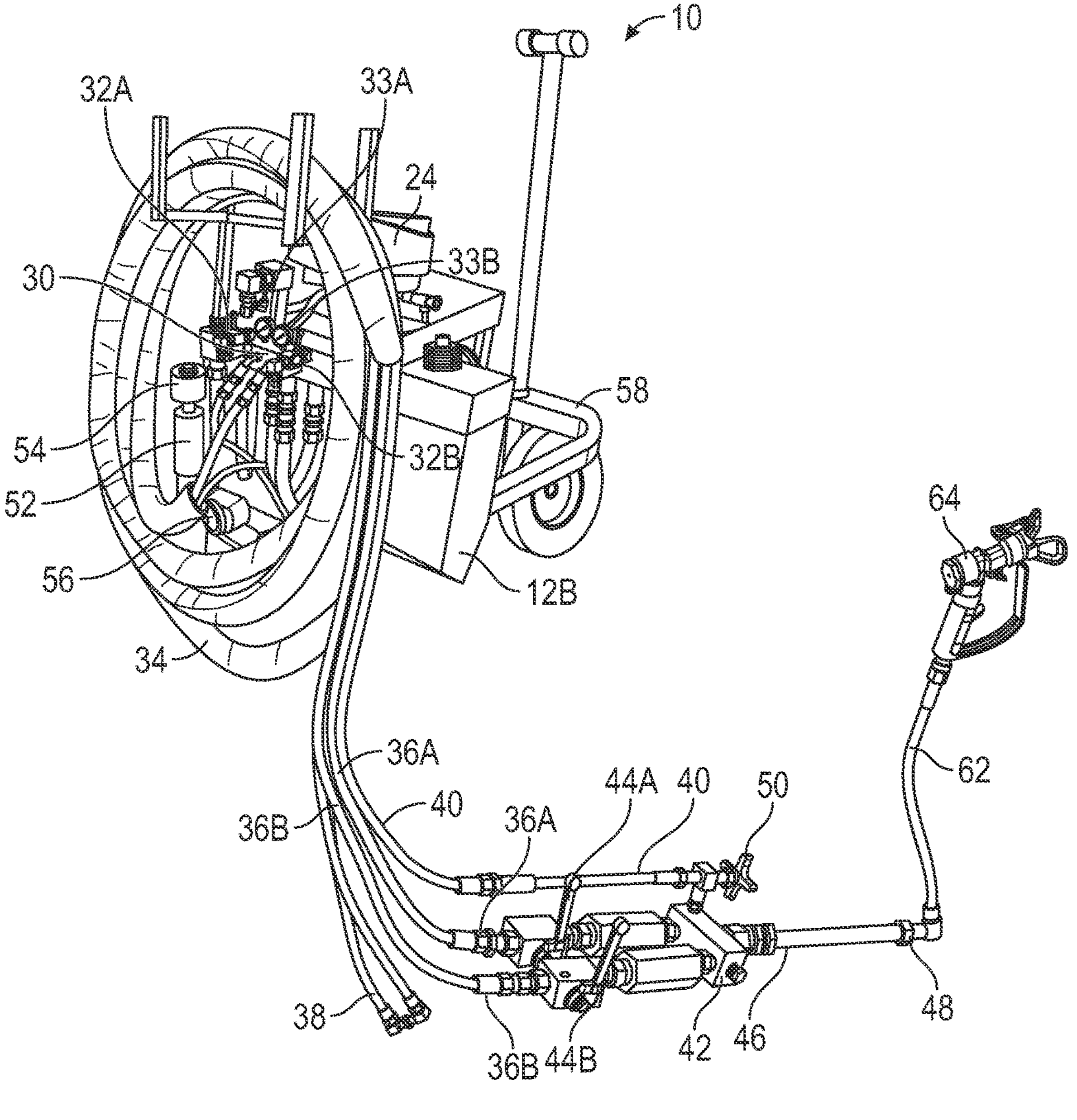
FIG. 2 is an isometric view of the paint spraying machine of FIG. 1 in accordance with one or more embodiments.

FIG. 2 is an isometric view of an embodiment of the paint spraying machine 10. The paint spraying machine 10 is mounted on a cart 58, which may be mobile such as by including wheels. As shown in addition to the hoppers 12A, 12B and the pump 24, the paint spraying machine 10 includes an outlet manifold 30, a hose bundle 34, and a mix manifold 42.

The outlet manifold 30 controls the flow of the components through the paint spraying machine 10 to the mix manifold 42, keeping the components separated until mixing in the mix manifold 42. To do so, the outlet manifold 30 includes manually operated circulation valves 32A, 32B operable to control the flow of components A and B through the paint spraying machine 10. The circulation valves 32A, 32B control the flow of components A and B, respectively, for either recirculation back to the hoppers 12A, 12B during heating and pressurizing or for pumping to the mix manifold 42. The circulation valves 32A, 32B can be set either in an open position for recirculation or a closed position for mixing and spraying. When spraying, the circulation valves 32A, 32B are set to have the components flow on to the hose bundle 34 discussed below. The outlet manifold 30 also includes pressure gauges 33A and 33B, which provide an indication of the component pressures generated by pump lowers 28A, 28B, respectively. The pump lowers 28A, 28B selected set the fixed mix ratio of the components. The mix ratio of the components in the mixture can be determined by weight or volume, depending on the coating being sprayed. When the pump lowers have equal volumetric displacement, the fixed mixed ratio is 1:1. When one pump lower has a greater volumetric displacement than the other, the fixed mixed ratio can be 2:1, 3:1, up to 4:1. The fixed mixed ratio is selected based on the plural component coating being sprayed to result in the fixed mixed ratio selected for the coating. Additionally, since the mix ratio is set by the pump lowers, changing the mix ratio involves changing the specific pump lowers used.

With the circulation valves 32A, 32B set to have the components flow on to the hose bundle 34, the components flow from the outlet manifold 30 through the hose bundle 34 separately to the mix manifold 42 where the components are mixed. The hose bundle 34 includes at least four separate fluid lines: a component A line 36A, a component B line 36B, a heating fluid line 38; and a solvent flush line 40. The hose bundle 34 includes the two component lines 36A, 36B for components A and B, respectively, to remain separate until mixed in the mix manifold 42. The hose bundle 34 can also include insulation. Further, a hose heating system 52 is operable to heat the components in the two separate component lines 36A, 36B before entering the mix manifold 42. The hose heating system 52 includes a hose heater 54 and a hose circulation pump 56 to heat and circulate heating fluid through the hose bundle 34. The heating fluid is circulated within its own heating fluid line 38 separate from the component lines 36A, 36B within the hose bundle 34. As the heating fluid is circulated through the heating fluid line 38 in the hose bundle 34, the components within the component lines 36A, 36B are heated to keep the components at a specified temperature.

The components flow through the hose bundle 34 separately to the mix manifold 42. The mix manifold 42 includes a static mixer 46 which combines the components together to form the coating. The mix manifold 42 includes manually-operated mix valves 44A, 44B operable to control the flow of component A and B separately entering the mix manifold 42. The mix valves 44A, 44B can be manually set to be in an open position for mixing and spraying or a closed position for flushing. When the mix valves 44A, 44B are set in the open position, the components flow to the static mixer 46. When the mix valves 44A, 44B are set in the closed position, the components are blocked from flowing to the static mixer 46 so that the static mixer 46 can be flushed as discussed below. The mix manifold 42 also includes a static mixer 46, where the components are mixed. The static mixer 46 can be any suitable static mixer. For example, the static mixer may be a mixing pipe that is a pipe with steel elements that fold the components within the pipe to combine them as they travel through the pipe. In addition, the components flow through the machine 10 in only one direction. This is achieved by check valves located throughout the machine 10 (not shown) that control back flow of the components.

The combined components then exit the static mixer 46 at a combined outlet 48 and are sprayed through a spray line. The spray line includes a mixed component line 62 and a spray gun 64 which are operable to spray the mixed and pressurized components. The spray gun 64 can be any spray gun suitable to spray coating materials.

The solvent flush line 40 also runs to the mix manifold 42, and the mix manifold 42 also includes a solvent flush valve 50. The solvent flush valve 50 controls the solvent flow through the mix manifold 42, and is used in combination with a solvent flush pump 60 to flush the locations in the paint spraying machine 10 where the two components are mixed together, as discussed with reference to FIG. 3. The solvent flush valve 50 can be manually set in an open position to allow the solvent to flow to the static mixer 46 or can be set in a closed position to block solvent flow during mixing and spraying of the components. To flush the mix manifold 42 and the subsequent parts of the paint spraying machine where the mixed components flow, the mix valves 44A, 44B on the mix manifold 42 are set in the closed position to block the components from flowing to the static mixer 46 and the solvent flush valve 50 is set in an open position to allow the solvent to flow into the mix manifold 42 for flushing.

Figure 3:
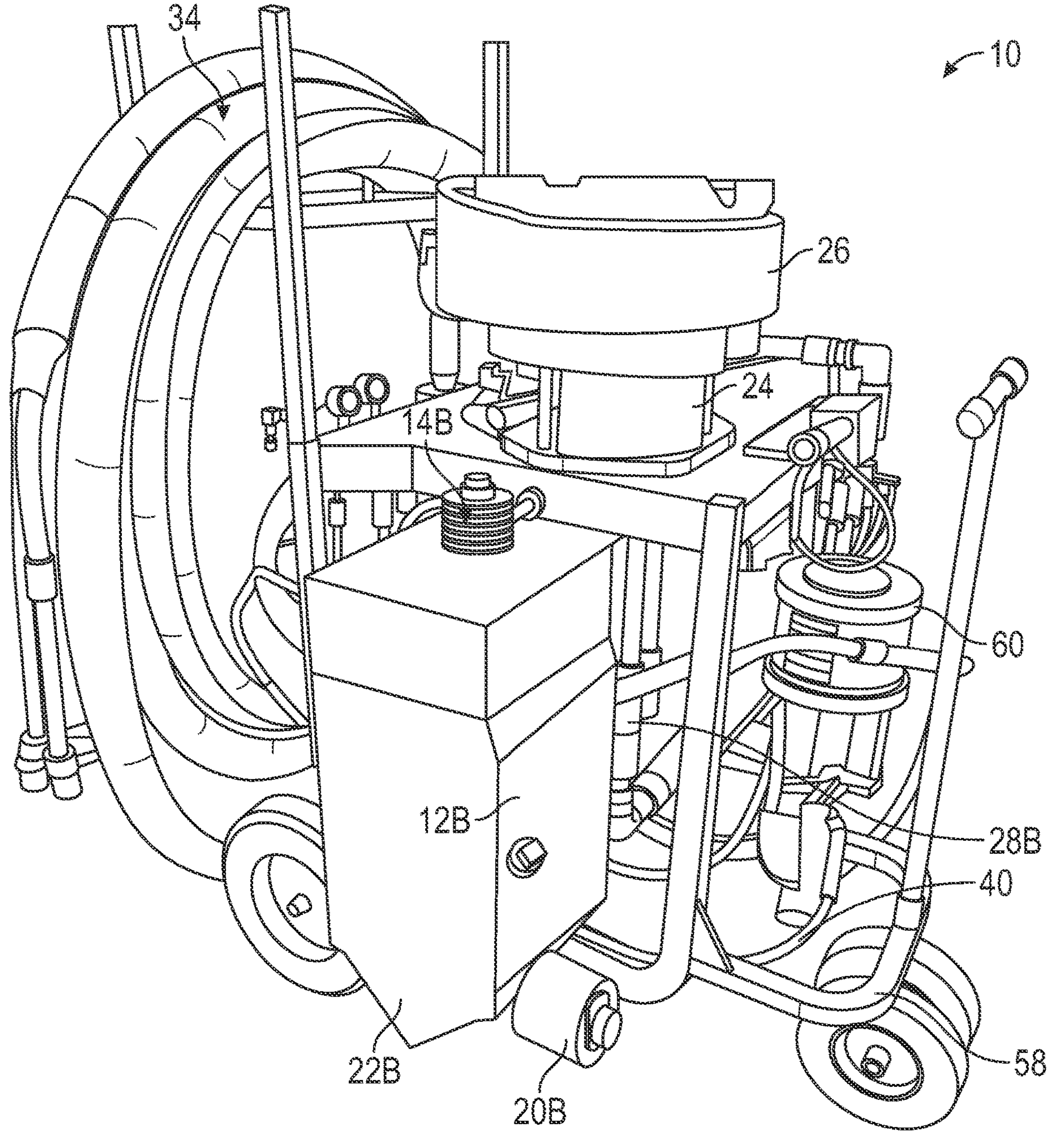
FIG. 3 is a perspective view of the back side of the paint spraying machine of FIG. 1 in accordance with one or more embodiments.

FIG. 3 is a perspective view of an embodiment of the paint spraying machine 10 depicting the solvent flush pump 60. The solvent flush pump 60 is operable to flush the mix manifold 42 and spray line, which are the only portions of the paint spraying machine where the two components are mixed together. The mixed components harden and set after a certain amount of time, so the portions of the machine where the mixed components flow require flushing after spraying the coating. The solvent flush pump 60 pumps the solvent through the solvent flush line 40 in the hose bundle 34 to the mix manifold 42, as shown in FIG. 2. Since the components are kept separate as the components flow through the paint spraying machine 10 until the components flow into the mix manifold 42, no equipment upstream of the mix manifold 42 needs to be flushed before the components harden and set. The only equipment that needs to be flushed is the mix manifold 42 and equipment downstream of the mix manifold 42, e.g., the spray line including the mixed component line 62 and the spray gun 64.

Figure 4:
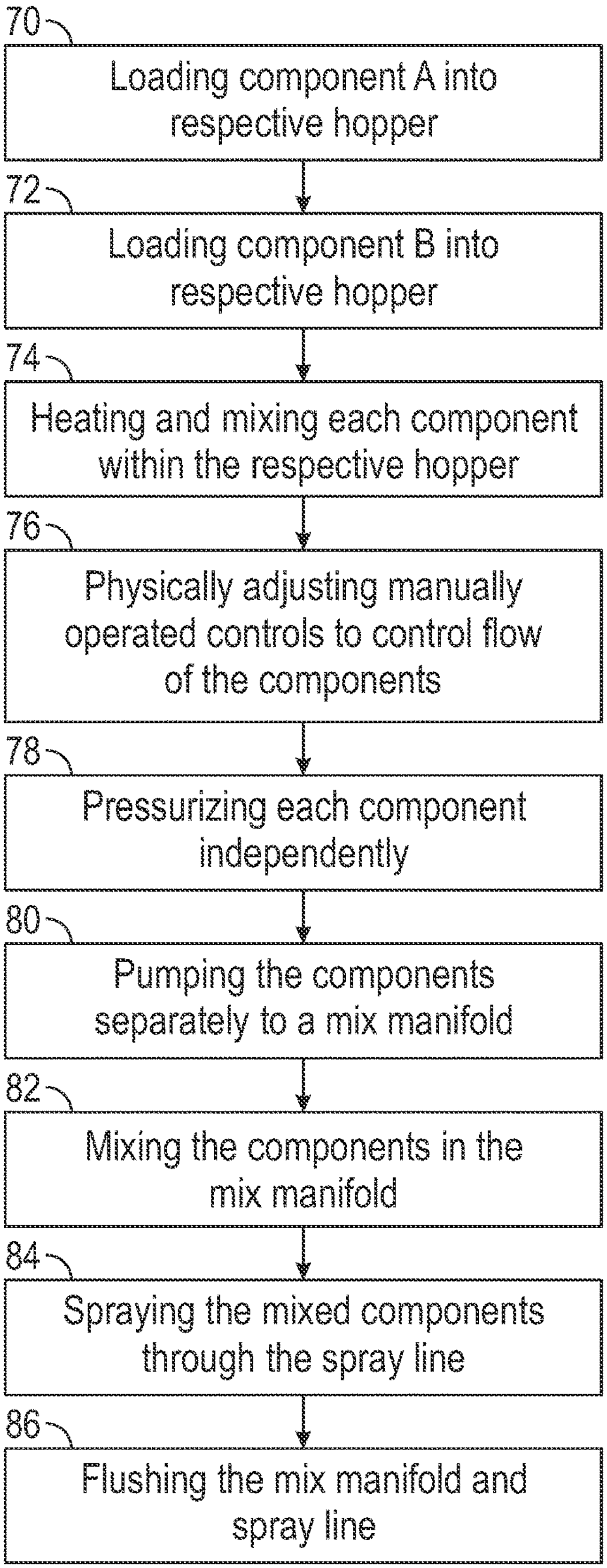
FIG. 4 is a diagram of a method for operating the paint spraying machine in accordance with one or more embodiments.

FIG. 4 depicts a method of operating the paint spraying machine, in accordance with one or more embodiments. As shown, the method includes the steps of loading component A into hopper A at 70, loading component B into hopper B at 72, heating and mixing each component within the respective hopper at 74, physically adjusting manually operated controls to control flow of the components through the machine at 76, pressurizing each component independently at 78, pumping the components separately to a mix manifold at 80, mixing the components in the mix manifold to the selected, fixed mix ratio at 82, spraying the mixed components through the spray line to apply the coating material at 84, and flushing the mix manifold and spray line at 86.

To power and operate the machine, the machine can be connected to a 120V electrical outlet (or other standardized voltage electrical outlet) for a power supply. To operate the air pump, an air compressor can be connected as an air supply for the pump. For steps 70 and 72, components A and B are added to hoppers 12A and 12B, respectively. The components are then mixed and heated within the respective hoppers 12A, 12B to the selected temperature specified for each component, step 74. To do so, the powered mixers mix each component within the respective hoppers as discussed in reference to FIG. 1. The heating system for each hopper, which includes a heater 20A, 20B and a heated jacket 22A, 22B around at least a portion of each hopper, heats the component within a respective hopper to the selected temperature, as discussed in reference to FIG. 1. The temperature is controlled by adjusting control knobs on heaters 20A, 20B, which can be manually operated to select the selected temperature for each component. While operating the heating system and powered mixer, each component is also recirculated to pressurize the component until the selected pressure for the component is reached, discussed below in step 78.

For physically adjusting manually operated controls to control flow of the components through the machine at step 76, the manually operated controls, including the manually operated circulation valves and the manually operated mix valves, are adjusted to control the flow of components through the machine. For example, the manually operated circulation valves 32A, 32B and manually operated mix valves 44A, 44B may be manually operated ball valves. As shown in FIG. 2, the paint spraying machine 10 includes manually operated circulation valves 32A, 32B on the outlet manifold 30 and mix valves 44A, 44B on the mix manifold 42. The outlet manifold 30 includes circulation valves 32A and 32B that control the flow of components A and B, respectively, for either recirculation back the hoppers 12A, 12B or for pumping to the mix manifold 42. For recirculation back the hoppers 12A, 12B, the circulation valves 32A, 32B are set to direct the flow of components from the outlet manifold 30 through the recirculation lines back to the hoppers, as shown in FIG. 1. When the circulation valves 32A, 32B are set for recirculation, the components are blocked from flowing to the mix manifold 42. Mix manifold 42 includes valves 44A and 44B operable to control the flow of component A and B, respectively, separately entering the mix manifold. Additionally, mix manifold 42 includes solvent flush valve 50 which controls the solvent flow through the mix manifold 42, and is used in combination with the solvent flush pump 60 to flush the paint spraying machine where the two components are mixed together, as discussed with reference to FIG. 3.

Step 78 (pressurizing each component independently) is achieved using the pump 24. Pump 24 includes separate pump lowers 28A, 28B for each component. As discussed with reference to FIG. 1, during recirculation of the components, each component is drawn out of the respective hopper 12A or 12B and is pressurized by a respective pump lower 28A or 28B. Pressure gauges 33A and 33B on outlet manifold 30 provide an indication of the component pressures generated by pump lowers 28A and 28B, respectively. Each component is recirculated to pressurize the component until the selected pressure for the component is reached. The recirculation of the components, described in reference to FIG. 1, promotes equal heating of the components and builds up the pressure of the components. During recirculation, each component is drawn out of a hopper 12A or 12B by the pump 24 and passes through the pump lower 28A or 28B to the outlet manifold 30. The component is then recirculated back to the hopper 12A or 12B and the recirculation is repeated until the component reaches the selected temperature and pressure for spraying. The pressure gauges 33A and 33B on the outlet manifold display the pressure of component A and B, respectively, generated by pump lowers 28A or 28B so that an operator can confirm when the components have been brought to the selected pressures.

Once the components reach the selected temperature and pressure for spraying, the circulation valves 32A and 32B are set for mixing, allowing the components to flow from the outlet manifold 30 through the hose bundle 34 separately to the mix manifold 42 where the components are mixed. Additionally, the mix valves 44A, 44B are set in an open position to allow the components to flow to the static mixer 46. For step 80 (pumping the components separately to a mix manifold), the pump 24, in which air motor 26 drives the pump lowers 28A, 28B, pumps the components such that the components are drawn out of the hoppers 12A, 12B and passed through the outlet manifold 30 and the hose bundle 34 to the mix manifold 42. Each pump lower 28A, 28B is operable to separately pressurize the components. The components remain separate while pumping the components to the mix manifold because each component is drawn out of the respective hopper 12A, 12B, pressurized by the respective pump lower 28A, 28B, passes through the outlet manifold 30 and hose bundle 34 in a respective component line 36A, 36B to the mix manifold 42.

While pumping the components separately to the mix manifold at 80, the hose heating system 52 heats the components within the component lines 36A, 36B in hose bundle 34, as discussed in FIG. 2. As discussed above, the hose heating system 52 heats and circulates a heating fluid through a separate heating fluid line 38 within hose bundle 34. The heating fluid is heated by a heater 54 and pumped through heating fluid line 38 by a hose circulation pump 56. As the heating fluid is circulated through the heating fluid line 38 in the hose bundle, the heating fluid heats the components within the component lines 36A, 36B.

For step 82 (mixing the components in the mix manifold to the selected, fixed mix ratio), the components flow from the hose bundle 34 to the mix manifold 42, where the components are mixed by the static mixer 46 according to the selected, fixed mix ratio. The mix ratio is set by the pump lowers 28A, 28B, and changing the mix ratio involves changing the specific pump lowers 28A, 28B used. The components enter the mix manifold 42 through the separate component lines 36A, 36B, are mixed together while traveling through the static mixer 46, and the combined components exit the static mixer 46 at the combined outlet 48.

For step 84 (spraying the mixed components through the spray line to apply the coating material), the combined components exit the combined outlet 48 and travel through the mixed component line 62 to the spray gun 64. The spraying is achieved using a spray gun 64 that is operable to spray the mixed and pressurized components.

After the coating material is applied, a solvent flush pump 60 can be used for step 86, flushing the mix manifold and spray line. As discussed with reference to FIG. 3, the solvent flush pump 60 pumps the solvent through the solvent flush line 40 in the hose bundle 34 to the mix manifold 42. Flushing the parts of the machine where the combined components flow cleans the spray paint machine 10 and keeps the mixed components from setting and hardening after a specific amount of time. However, because the components are kept separate until the mix manifold 42, only the mixed component line 62, spray gun 64, and the mix manifold 42 need to be flushed. To flush the mix manifold 42 and the subsequent parts of the paint spraying machine where the mixed components flow, the component valves 44A, 44B on the mix manifold 42 are set in a closed position to block the components from flowing to the static mixer 46 and the solvent flush valve 50 is set in an open position to allow the solvent to flow for flushing.

Certain terms are used throughout the description and claims to refer to particular features or components. As one skilled in the art will appreciate, different persons may refer to the same feature or component by different names. This document does not intend to distinguish between components or features that differ in name but not function.

While descriptions herein may relate to "comprising" various components or steps, the descriptions can also "consist essentially of" or "consist of" the various components and steps.

Unless otherwise indicated, all numbers expressing quantities are to be understood as being modified in all instances by the term "about" or "approximately". Accordingly, unless indicated to the contrary, the numerical parameters are approximations that may vary depending upon the desired properties of the present disclosure. As used herein, "about", "approximately", "substantially", and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus 10% of the particular term and "substantially" and "significantly" will mean plus or minus 5% of the particular term.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A paint spraying machine for applying a plural component coating material comprising a component A and a component B, the machine comprising:

a separate hopper for each component in which the components A and B are held respectively;

a pump operable to separately pressurize the components in the respective hoppers to independently selected pressures for each component, wherein the pump comprises a separate pump lower for each component configured to control the pressurization of the respective component to the selected pressure;

a mix manifold configured to receive the components separately from the pump and mix the components at a selected, fixed mix ratio fixed by the pump lowers;

manually operated controls adjustable to control flow of the components through the machine; and a spray line comprising a spray gun operable to spray the mixed and pressurized components.

2. The paint spraying machine of claim 1, wherein each hopper comprises a powered mixer operable to mix the component in the hopper.

3. The paint spraying machine of claim 1, wherein each hopper comprises a heating system operable to heat the component in the hopper.

4. The paint spraying machine of claim 3, wherein each heating system comprises a heater and a heated jacket around at least a portion of a respective hopper and each heating system is operable to heat the component in the hopper to a selected temperature.

5. The paint spraying machine of claim 4, wherein the paint spraying machine is configured to recirculate the component through the machine and back to the hopper and the heating system is operable to heat the component in the hopper until the component reaches the selected temperature.

6. The paint spraying machine of claim 1, wherein the mix manifold comprises a static mixer.

7. The paint spraying machine of claim 1, wherein the selected, fixed mix ratio of the components is set by the pump lowers selected.

8. The paint spraying machine of claim 1, further comprising an outlet manifold configured to control flow of the components through the machine and wherein the outlet manifold is upstream of the mix manifold.

9. The paint spraying machine of claim 8, wherein the outlet manifold comprises fluid pressure gauges operable to measure a pressure of each component independently and wherein the manually operated controls comprise manually operated valves adjustable to control flow through the paint spraying machine.

10. The paint spraying machine of claim 1, further comprising a solvent flush pump operable to flush the mix manifold and spray line.

* * * * *